Sept. 25, 1951  C. F. ROBBINS  2,568,933
MOUNTING AND OPERATING MEANS FOR ELECTRIC SWITCHES
Original Filed July 4, 1942  3 Sheets-Sheet 1

Inventor
Clyde F. Robbins
By Frank H. Hubbard
Attorney

Sept. 25, 1951 C. F. ROBBINS 2,568,933
MOUNTING AND OPERATING MEANS FOR ELECTRIC SWITCHES
Original Filed July 4, 1942 3 Sheets-Sheet 2

Inventor
Clyde F. Robbins
By Frank H. Hubbard
Attorney

Sept. 25, 1951  C. F. ROBBINS  2,568,933
MOUNTING AND OPERATING MEANS FOR ELECTRIC SWITCHES
Original Filed July 4, 1942  3 Sheets-Sheet 3
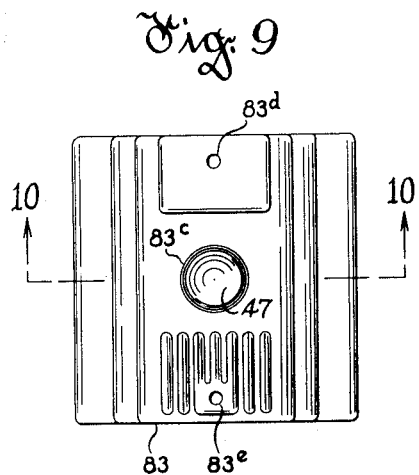
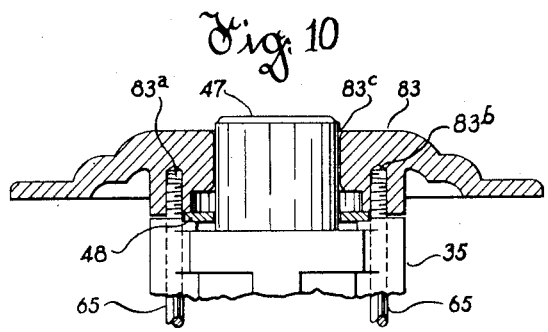
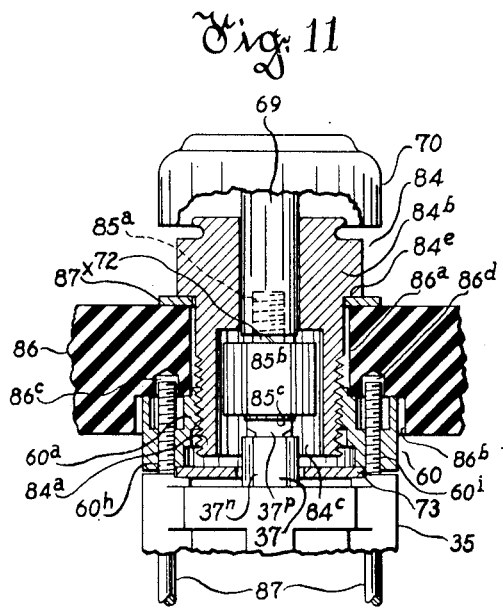
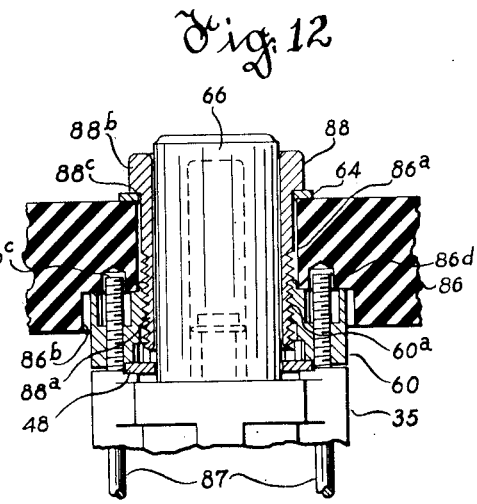
Inventor
Clyde F. Robbins
By Frank H. Hubbard
Attorney Patented Sept. 25, 1951

2,568,933

UNITED STATES PATENT OFFICE 2,568,933

MOUNTING AND OPERATING MEANS FOR ELECTRIC SWITCHES

Clyde F. Robbins, Milwaukee, Wis., assignor to Cutler-Hammer, Inc., Milwaukee, Wis., a corporation of Delaware Original application July 4, 1942, Serial No. 449,756, now Patent No. 2,460,034, dated January 25, 1949. Divided and this application June 14, 1948, Serial No. 32,883

7 Claims. (Cl. 200—17)

This invention relates to improvements in mounting and operating means for electric switches, and especially for manually operable switches of the reciprocating contactor type.

A primary object of the invention is to provide various novel and simple forms of adapters for use with electric switches of the aforementioned character, whereby the latter are adapted for various forms of mountings, such as base mounting, one-hole mounting, cover mounting, and for mounting on panels of various thicknesses.

Another object is to provide a novel form of mushroom-head type of operator for switches of the aforementioned character.

Other objects and advantages of the invention will hereinafter appear.

This application is a division of my Patent No. 2,460,034, granted January 25, 1949, for Electric Switches, and assigned to the same assignee as the present application.

The accompanying drawings illustrate certain embodiments of my invention which will now be described, it being understood that my invention is susceptible of embodiment in other forms without departing from the scope of the appended claims.

In the drawings,

Fig. 9 is a top plan view of a cast metal flush plate, to the inner surface of which a pushbutton switch may be attached.

Fig. 10 is a vertical sectional view, on the line 10—10 of Fig. 9, showing the manner of attaching the switch base to the flush plate, a fragment only of the insulating base being shown in elevation.

Fig. 11 is a vertical sectional view of the adapter elements employed for attaching a switch, having a mushroom-head type of operator, to supporting panels up to two inches in thickness, a fragment of the switch base being shown in elevation, and Fig. 12 is a view similar to Fig. 11, but showing the adapter elements employed for attaching a pushbutton type of switch to panels up to two inches in thickness.

Figure 1:
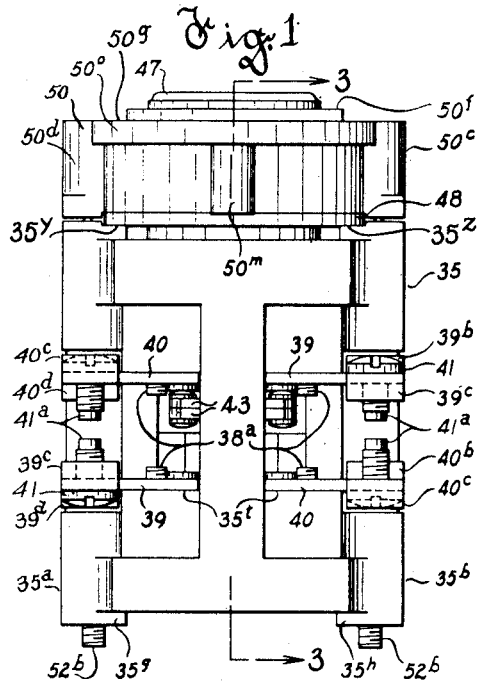
Figure 1 is a side elevational view of a manually operable switch of the reciprocating contactor type having one of my novel adapter members associated therewith to provide for base mounting of the switch.
Figure 2:
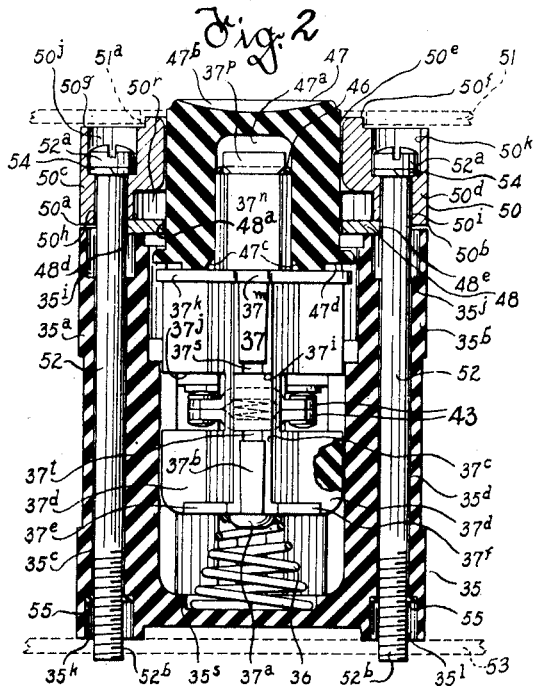
Fig. 2 is a central vertical sectional view of the switch and adapter member shown in Fig. 1, in a plane parallel to the elevational view of Fig. 1; portions of the enclosing casing or housing being shown in dotted lines.
Figure 3:
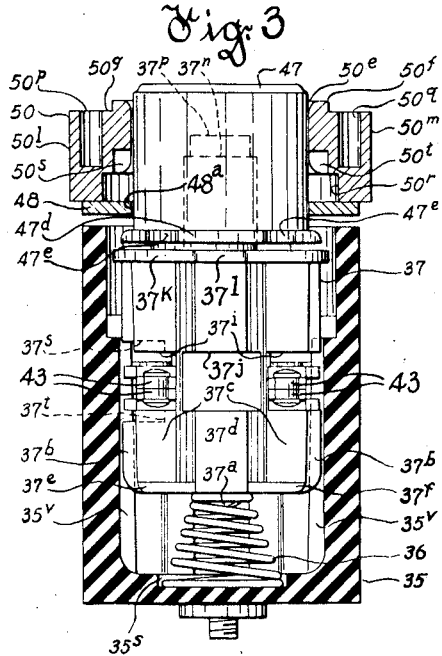
Fig. 3 is a central vertical sectional view, on the line 3—3 of Fig. 1, looking in the direction of the arrows, illustrating certain additional structural features of the adapter member.

Referring first to the base mounted switch illustrated in Figs. 1, 2 and 3, the numeral 35 designates the one-piece molded insulating base, which is common to all forms of switches herein contemplated. Base 35 is adapted to be produced in a suitable multi-part hot-molding die (not shown); a very high grade "Bakelite" molding composition preferably being employed. The structural details of base 35, plunger 37, and the contactor and contact parts associated therewith are more fully described in my aforementioned Patent No. 2,460,034; corresponding parts in the two applications having like numerals of reference applied thereto. Thus numeral 36 designates a spirally-wound, cone-shaped, compression spring, which is interposed between the bottom wall of a recess in base 35 and the lower end of a molding insulating plunger 37 carrying contactors 43 for cooperation with stationary contacts 39, 40. Plunger 37 has an upward extension 37ⁿ to which a pushbutton 47 is removably attached. Pushbutton 47 is provided adjacent its lower end with an annular flange 47$^d$ having four symmetrically arranged notches, two of which are shown at 47$^e$, 47$^e$ in Fig. 3. The functions of the portions 39$^b$, 39$^c$, 39$^d$, 40$^b$, 40$^c$, 40$^d$, 41 and 41$^a$ of the combined stationary contact and wiring terminal members 39 and 40 (Fig. 1) are described in detail in said Patent No. 2,460,034; said members being attached to base 35 by suitable screws, the shanks of which are designated by numeral 38$^a$.

A flat, punched sheet metal guide plate 48 is provided with a circular opening 48$^a$ (Figs. 2 and 3) to slidably accommodate and guide the pushbutton 47 to assist in restricting the latter to reciprocating movement in a straight line, said plate being provided at opposite sides thereof with lugs having U-shaped notches formed therein, as shown at 48$^d$ and 48$^e$ in Fig. 2. Plate 48 is adapted to seat against the upper ends of extensions 35$^a$ and 35$^b$, the latter having downwardly offset ledges 35$^y$ and 35$^z$ (Fig. 1) to accommodate a portion of the thickness of said lugs and the adjacent peripheral portions of plate 48. The functions of the portions 35$^g$, 35$^h$, 35$^i$, 35$^j$, 35$^k$, 35$^l$, 35$^s$, 35$^t$, and 35$^v$ are described in detail in the aforementioned Patent No. 2,460,034.

The switch parts thus far described may be assembled in the manner described in detail in my aforementioned Patent No. 2,460,034. After the desired or required number and location of pairs of contacts and contactors has been effected, the pushbutton 47 is pressed onto the plunger extension 37$^n$ (the spring ring 46, Fig. 2, having been previously assembled upon the reduced end 37$^p$ of said extension) and the plate 48 is positioned upon the upper ends of the extensions 35$^a$ and 35$^b$ to surround the pushbutton and to overlie the flange 47$^d$ on the latter (Figs. 2 and 3).

Thereafter an adapter member 50 of substantially annular form is positioned over plate 48 and is adapted to seat against the latter throughout the annular overlapping portions of said parts. As indicated at 50$^a$ and 50$^b$ in Fig. 2 the lower end portions of lateral extensions 50$^c$ and 50$^d$ of member 50 extend downwardly a slightly greater distance than the main body thereof, the downwardly extending portions being formed to closely surround or fit the aforementioned lugs on plate 48, to assist in preventing relative lateral movement between said parts. Member 50 preferably consists of a zinc base metal die casting, although die castings of other suitable or desired compositions may, of course, be employed.

Member 50 has a relatively large central circular opening 50$^e$ formed therein to provide sliding clearance for pushbutton 47, which normally projects only slightly above the annular extension 50$^f$ on said member. The annular flat upper surface 50$^g$ of member 50 around extension 50$^f$ is adapted to rather closely underlie a panel or cover member, shown in dotted lines at 51 in Fig. 2, said panel or cover member having a circular opening 51$^a$ to accommodate the extension 50$^f$. The lateral extensions 50$^c$ and 50$^d$ are vertically alined with the lateral extensions 35$^a$ and 35$^b$ of base 35, and are provided with vertical passages 50$^h$ and 50$^i$, the upper ends of which open to relatively deep countersinks 50$^j$ and 50$^k$ which are respectively adapted to accommodate the heads 52$^a$, 52$^a$ of relatively long bolts or screws 52, 52, whose shanks extend downwardly through passages 50$^h$, 50$^i$, notches 48$^d$, 48$^e$, passages 35$^c$, 35$^d$, and have threaded lower ends 52$^b$, 52$^b$ which take into tapped openings in the inner wall of a panel or casing, as indicated in dotted lines at 53 in Fig. 2. Lockwashers 54, 54 (Fig. 2) are preferably associated with the heads 52$^a$ of the bolts to prevent accidental loosening thereof, and fiber or leather washers 55 cooperate with the threaded ends 52$^b$ of the bolts to prevent accidental dislocation of the latter prior to base mounting of the switch to a suitable support.

Adapter member 50 is provided with a pair of opposed lateral extensions 50$^l$ and 50$^m$ (Fig. 3) the lateral edges of which are flush with diametrically opposite peripheral flange portions, one of which is shown at 50$^o$ in Fig. 1; said extensions providing material to enable formation of a pair of upwardly opening recesses 50$^p$ and 50$^q$ (Fig. 3), which with countersinks 50$^j$ and 50$^k$ are selectively adapted to accommodate a lug upon an indicating or legend plate to prevent rotary displacement of the switch unit. Such an indicating plate is not ordinarily employed, however, in the base mounted type of switch shown in Figs. 1 to 3.

Adapter 50 is also preferably provided with an annular recess 50$^r$ (Figs. 2 and 3) which is adapted to accommodate certain additional elements not required for switches of the character disclosed herein; a plurality of relatively small rectangular notches or recesses being formed interiorly of member 50 for communication with recess 50$^r$, two of said notches being shown at 50$^s$ and 50$^t$ in Fig. 3.

The aforementioned pushbutton 47 is preferably provided with a concave upper surface 47$^b$ (Fig. 2), which may be provided with an indicating legend (not shown). The recess 47$^a$ in pushbutton 47 accommodates plunger extension 37$^n$ with a rather close fit; and said parts are frictionally held together by the action of spring ring 46. The beveled lower end 47$^c$ of pushbutton 47 facilitates telescoping of the latter onto extension 37$^n$.

The functions of the respective portions 37$^a$, 37$^b$, 37$^c$, 37$^d$, 37$^e$, 37$^f$, 37$^i$, 37$^j$, 37$^k$, 37$^l$, 37$^m$, 37$^s$ and 37$^t$ are more or less obvious, and are described in detail in the aforementioned Patent No. 2,460,034.

Figure 4:
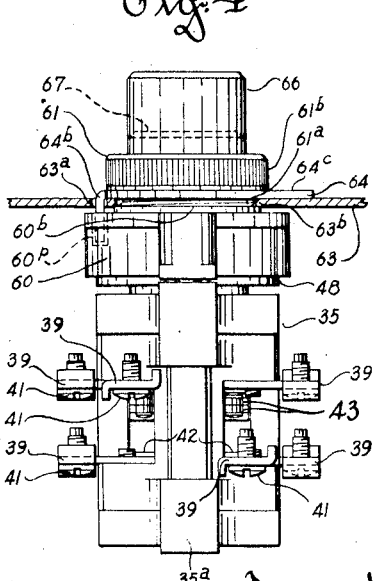
Fig. 4 is a side elevational view of a modification, wherein substitute parts are employed to provide for one-hole mounting of the switch; a relatively long pushbutton being shown in full lines, and an alternative shorter form of pushbutton being indicated by dotted lines.
Figure 5:
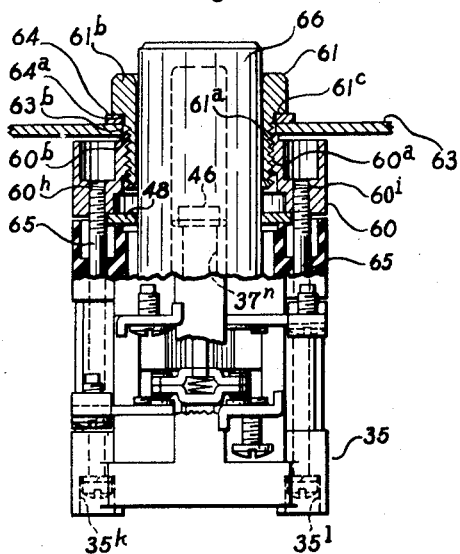
Fig. 5 is a side elevational view, at a right angle to that of Fig. 4, with the one-hole mounting adapter parts and the upper end portion of the insulating base shown in vertical section, and with another portion of the base broken away to show the contactors engaged with the lower contacts as an incident to depression of the pushbutton.

The switch of Figs. 4 and 5 is of the pushbutton type and is adapted for one-hole mounting. For this purpose an adapter 60 is provided. Adapter 60 is exteriorly the same as adapter 50 aforedescribed, and accordingly one part of the casting die may be employed in forming both adapters 50 and 60. However, different core portions are required for forming the respective adapters. Thus adapter 60 is provided with a central circular opening which is of substantially larger diameter than the opening 50$^e$ in adapter 50. Said opening in adapter 60 is tapped, as shown at 60$^a$ in Fig. 5, to cooperatively receive the externally threaded lower end portion 61$^a$ of a hollow bushing 61, the enlarged upper end of which is vertically milled peripherally throughout the major portion of its height to facilitate rotation thereof, either manually or otherwise, into clamping position; said enlarged end having a horizontal shoulder 61$^c$ (Fig. 5) to act as a clamping surface.

Interposed between said shoulder 61$^c$ and the upper surface of a panel or cover member 63, here shown as composed of metal, is a punched and stamped sheet metal indicating plate 64. Plate 64 is provided with a circular opening 64$^a$ (Fig. 5) to accommodate portion 61$^a$ of bushing 61, and said plate is provided with an integral lug bent downwardly at a right angle thereto, as shown at 64$^b$ in Fig. 4, to fit into a recess of substantially corresponding size, as shown in dotted lines at 60ᵖ in said figure, whereby plate 64 is restrained against relative rotary displacement. As shown in Fig. 4, member 63 is provided with an opening 63ᵃ to provide clearance for lug 64ᵇ, and member 63 is also provided with an opening 63ᵇ to afford clearance for the lower end portion 61ᵃ of bushing 61. The horizontal surface portion 60ᵇ of adapter 60 underlies a portion of member 63 around the opening 63ᵇ in the latter, whereby adapter 60 is clamped to member 63. Adapter 60 is likewise provided with a pair of tapped openings 60ʰ and 60ⁱ, which are of relatively smaller diameter than the aforedescribed untapped openings 50ʰ and 50ⁱ of adapter 50 (see Fig. 2). Said tapped openings 60ʰ and 60ⁱ are respectively adapted to receive the threaded upper ends of a pair of screws or bolts 65, 65, the heads of which are located in the countersinks 35ᵏ and 35ˡ (Fig. 5) in the lower surface of base 35. The top surface of portion 64ᶜ (Fig. 4) of member 64 may have any suitable or desired legend imprinted, embossed, engraved or otherwise applied thereto, to correspond with the electrical characteristics or functions of the particular switch.

The pushbutton 66 in Figs. 4 and 5 is substantially longer than the pushbutton 47 of Figs. 1 to 3. Pushbutton 66 requires the additional length not only because of the added length of the assembly occasioned by the use of bushing 61, but also because of the fact that it is desired to have a greater length of the upper end of pushbutton 66 exposed in the normal position of the latter, as best illustrated in Fig. 4. If desired, a relatively shorter pushbutton may be employed in the device of Figs. 4 and 5, as indicated in dotted lines at 67 in Fig. 4. The pushbutton 67 is also substantially longer than the pushbutton 47 of Figs. 1 to 3. Except for the differences in length, the pushbuttons 66 and 67 may be the same as the pushbutton 47. It follows that all of the pushbuttons 47, 66 and 67 may be formed in molding dies having certain parts thereof identical, different core members only being required to produce the relatively longer plunger-end-receiving recesses in pushbuttons 66 and 67.

Except for the illustrated arrangement of terminals in Figs. 4 and 5, whereby it is possible to use like combined contact and terminal members, 39, for the entire switch, it is to be understood that the elements of such switch not mentioned may be identical with the corresponding elements of the switch of Figs. 1 to 3.

Figure 6:
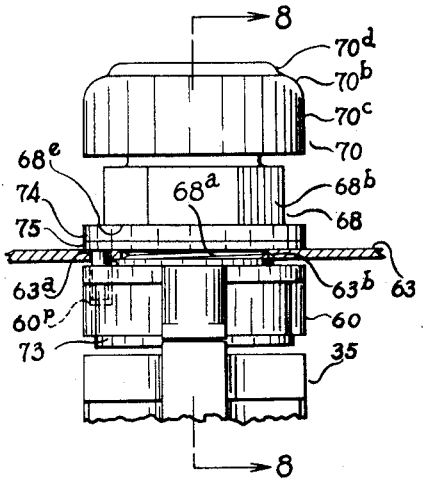
Fig. 6 is a fragmentary side elevational view similar to Fig. 4, but showing a mushroom-head type of operator in combination with a one-hole mounting type of switch.
Figure 8:
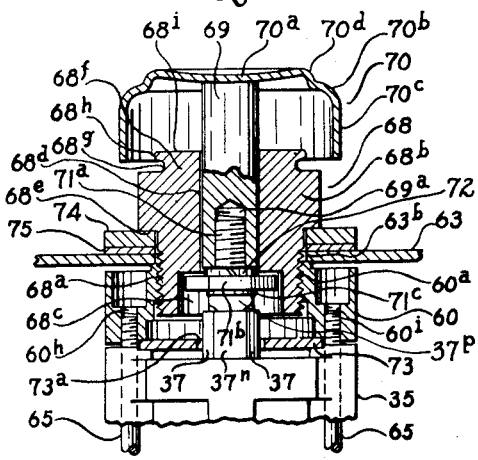
Fig. 8 is a vertical sectional view, on the line 8—8 of Fig. 6, the upper end portion of the base, the plunger, and portions of the operator being shown in elevation.

In the modification illustrated in Figs. 6 and 8 it is to be understood that the insulating base 35 may have any desired arrangement of the aforedescribed stationary contact and terminal members and bridging contactors. This switch is of the one-hole mounting type having a mushroom-head type of operator. Accordingly I prefer to employ an adapter member 60 identical with the adapter of Figs. 4 and 5. A metal bushing 68 has an externally threaded lower end portion 68ᵃ which penetrates the panel opening 63ᵇ and takes into the tapped opening 60ᵃ in adapter 60. Bushing 68 is provided with an enlarged upper end portion 68ᵇ preferably of hexagonal form in transverse cross section, as best illustrated in Fig. 6. Bushing 68 is also provided at its lower end with a relatively large, centrally located, downwardly opening recess 68ᶜ, Fig. 8; and a passage 68ᵈ, of relatively smaller diameter than but alined with said recess, extends to the upper end of said bushing.

The mushroom-head operator includes a cylindrical shank member 69 which is adapted for a free but relatively close sliding fit within the bushing passage 68ᵈ. A stamped sheet metal head 70 of circular contour has its concave or dished upper surface portion alined with and rigidly attached to the upper end of shank member 69, as by spot-welding, as indicated at 70ᵃ. Head 70 has an annular downwardly curved portion 70ᵈ, an outwardly curved portion 70ᵇ adjacent thereto, and a vertically downwardly extending skirt portion 70ᶜ, which is of a diameter to clear the enlarged portion 68ᵇ of bushing 68.

The shank portion 69 is provided at its lower end with a drilled and tapped recess 69ᵃ to receive the shank 71ᵃ of a specially formed bolt, the hexagonal head of which is designated by numeral 71ᵇ (Fig. 8). A split lock-washer 72, of smaller diameter than shank member 69, is preferably interposed between the lower end of the latter and the bolt head 71ᵇ, to restrain said bolt against accidental loosening. Bolt head 71ᵇ underlies the end wall of recess 68ᶜ to prevent accidental manual removal of shank member 69 from bushing 68, whereas, as shown in Fig. 8, said bolt head 71ᵇ is normally spaced downwardly to a slight degree from said end wall of recess 68ᶜ. Formed integrally with and located centrally upon the lower surface of bolt head 71ᵇ is a relatively short, cylindrical, downward extension 71ᶜ which is adapted to abut against the flat, square upper surface of the portion 37ᵖ of plunger extension 37ⁿ.

A flat, punched sheet metal plate 73, having a thickness and peripheral contour identical with those of plate 48 aforedescribed, is provided with a central circular opening 73ᵃ of a diameter to accommodate the plunger extension 37ⁿ and the downward extension 71ᶜ of bolt head 71ᵇ, but smaller than the peripheral contour of said bolt head; wherefore the lower surface of the latter is adapted to abut against the upper surface of plate 73, upon depression of the mushroom-head, to positively limit the degree of inward movement of extension 71ᶜ against the plunger 37. In this manner any possible injury to the contacts and contactors, or to the plunger 37 carrying the latter, is insured against, in the event of excessive pressure being applied to the mushroom-head operator. The insulating base 35 with its associated parts is rigidly attached to adapter member 60 as by means of the pair of bolts 65, in the manner described in connection with Figs. 4 and 5.

The horizontal annular shoulder 68ᵉ is adapted to seat against the upper surface of a panel of a suitable thickness to insure the proper distance of the end wall of recess 68ᶜ from the extension 37ᵖ of plunger 37 in the normal position of the latter, but where a relatively thin panel 63 is employed I prefer to interpose between said shoulder 68ᵉ and the upper surface of the panel a metal washer or washers of suitable thickness, as shown at 74 and 75. By this means proper normal (or upper extreme) positioning of plunger 37, under the bias of spring 36 aforedescribed, may be insured.

Figure 7:
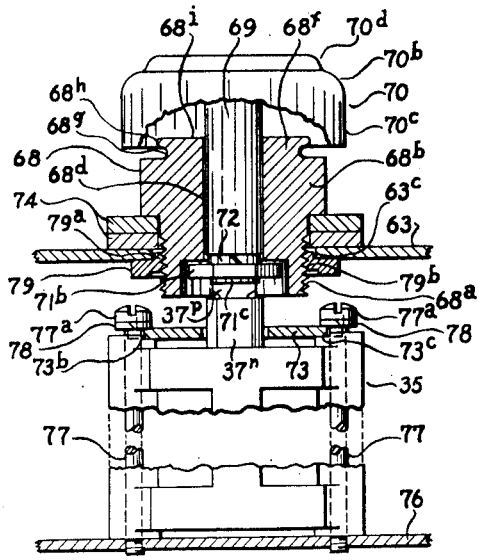
Fig. 7 is a side elevational view somewhat like Fig. 1, but showing a mushroom-head type of operator in combination with a base mounted type of switch, portions of the operator and the one-hole mounting means therefor being shown in vertical section, and only upper and lower fragments of the insulating base being illustrated.

The switch shown in Fig. 7 includes most of the parts of the switch shown in Figs. 6 and 8, and such parts have been given corresponding numerals of reference. In Fig. 7, however, the base 35 is adapted to be attached to a rear panel or casing wall 76 as by means of a pair of bolts 77, 77 of suitable length; the heads 77ᵃ of said bolts being adapted to overlie the opposite notched ends or extensions 73ᵇ and 73ᶜ of plate 73 to provide for clamping of base 35 in position. A pair of lock-washers 78, 78 preferably underlie the heads of bolts 77 to prevent accidental loosening thereof.

The front panel or cover member 63 in Fig. 7 is adapted to be spaced at such a distance from the rear panel 76 that the extension 71$^c$ of bolt head 71$^b$ may rest against the end portion 37$^p$ of plunger 37 without affecting the outward (or upward) bias upon the latter afforded by the aforementioned spring 36. As will be noted, the mushroom-head operating elements in Fig. 7 are supported by panel 63 substantially in the manner disclosed in Figs. 6 and 8, whereas the insulating base 35 with its associated parts is attached to panel 76, as aforedescribed. I therefore provide in the panel 63 in Fig. 7 a circular opening 63$^c$ which is of relatively larger diameter than the aforedescribed opening 63$^b$ (Fig. 8). Said opening 63$^c$ is adapted to provide rotating clearance for the upwardly extending annular flange 79$^a$ of a bushing or washer 79, which is preferably of square or other polygonal contour to provide for engagement thereof by a wrench or similar tool, washer 79 being internally threaded, as indicated at 79$^b$, for cooperation with the reduced and threaded portion 68$^a$ of bushing 68.

In order to properly locate bushing 68 vertically with respect to plunger 37 of the switch in Fig. 7, I prefer to employ a pair of washers 74, only one washer of that thickness being employed in the switch of Figs. 6 and 8.

Referring more specifically to the mushroom-head operator shown in each of Figs. 6 to 8, it will be noted that bushing 68 is provided at its upper end with an integral extension 68$^f$ (Figs. 7 and 8) of reduced diameter, said extension being defined by a neck portion 68$^g$ of concave form in vertical cross-section and an adjacent overhanging end portion 68$^h$ of convex form in vertical cross section. The skirt portion 70$^c$ of the mushroom-head 70 is adapted to overlap the flat upper end surface 68$^i$ of bushing 68 to some extent, even in the outer extreme position of said mushroom-head. Hence these parts cooperate to prevent direct access to the shank 69 of thrown globules or particles of oil or grease; whereas the relatively close sliding fit of shank 69 within passage 68$^d$ in bushing 68 further assists in preventing access of oil, grease or other foreign matter to the contacts and contactors associated with base 35. This arrangement is especially effective when, as usual, the switch is mounted with the height of the base 35 extending in a horizontal plane.

In Figs. 9 and 10 I have shown a switch may be like that shown in Figs. 1 to 3, except that a flush plate 83 has been substituted for the adapter member 50 of Figs. 1 to 3, and screws 65, 65 (like those of Figs. 4 and 5) are utilized to secure switch base 35 and its associated parts, including pushbutton 47, to plate 83, instead of using the base-mounting screws 52, 52 of Figs. 1 to 3. The plate 48 of Figs. 1 to 3 is employed in the device of Figs. 9 and 10 to positively limit the degree of outward movement of pushbutton 47, although, as aforedescribed, pushbutton 47 will normally be frictionally held to the plunger by the aforementioned spring ring 46, whereas the movable contactor or contactors will cooperate with the upper stationary contacts to limit the degree of outward movement of said plunger.

Plate 83 is provided with a pair of tapped recesses 83$^a$ and 83$^b$ to receive the shanks of screws 65, the same having a circular opening 83$^c$ formed therein to provide sliding clearance for and to assist in guiding pushbutton 47. Plate 83 is preferably a metal die casting, and the same may embody upon its outer surface a suitable design, as best illustrated in Fig. 9. Plate 83 may be provided with a pair of openings 83$^d$ and 83$^e$ to provide clearance for the shanks of bolts or screws (not shown) to attach the plate to the open end of a suitable box or casing.

The mushroom-head operated switch shown in Fig. 11 is adapted for mounting upon panels up to two inches in thickness, and most of the parts thereof may be identical with the corresponding parts of the switch shown in Figs. 6 and 8, which parts have been given numerals of reference. Thus the mushroom head 70, shank 69, lockwasher 72, adapter member 60, plate 73, and the base 35 with its associated parts, including plunger 37 are the same in both devices. However, in Fig. 11 I have shown a bushing 84 which is similar to the aforedescribed bushing 68, except that bushing 84 is provided with a relatively longer reduced lower end portion 84$^a$, which is externally threaded throughout the major portion of its length for cooperation with the internally threaded portion 60$^a$ of member 60.

Bushing 84 is provided with a correspondingly longer downwardly opening cylindrical recess 84$^c$ which is adapted to accommodate and to provide rotating clearance for the special bolt whose relatively long head of hexagonal form in transverse cross section is designated by numeral 85$^b$, and whose shank, shown in dotted lines at 85$^a$, threads into the tapped recess in the lower end of shank member 69. Said bolt head 85$^b$ has formed integrally therewith a cylindrical downward extension 85$^c$ corresponding in dimensions with extension 71$^c$ in Figs. 7 and 8.

The panel 86 in Fig. 11 is shown as composed of suitable insulating material, the same having a circular opening 86$^a$ to accommodate the lower end portion 84$^a$ of bushing 84. Panel 86 is provided in its lower face with a relatively large circular countersink or recess 86$^b$ which is adapted to freely receive a portion of the length of adapter member 60. Recess 86$^b$ is concentric with passage 86$^a$; and said recess 86$^b$ is provided at diametrically opposite predetermined points with a pair of drilled recesses 86$^c$ and 86$^d$, which are respectively adapted to accommodate the relatively long threaded shank portions of a pair of screws 87, which penetrate the tapped openings 60$^h$ and 60$^i$ in member 60 to provide for attachment of base 35 to the latter, as aforedescribed. The shanks of screws 87 thus insure proper rotary or angular positioning of member 60 and base 35 when assembled with respect to panel 86, and also insure against accidental angular displacement of said parts after such final assembly. An annular metal washer 87$^x$ is preferably interposed between the shoulder 84$^e$ formed between the enlarged portion 84$^b$ of hexagonal form in transverse cross section and the reduced portion 84$^a$ to reinforce the outer surface of panel 86 and to avoid marring or scraping thereof as an incident to tightening of bushing 84.

In Fig. 12 I have illustrated a pushbutton switch adapted for one-hole mounting upon panels up to two inches in thickness. The panel 86 is identical with that shown in Fig. 11, the same having a circular passage 86$^a$, a downwardly opening counter-sink 86$^b$ concentric with said passage, and a diametrically opposed pair of recesses 86$^c$ and 86$^d$. The adapter member 60 and base 35 are identical with the correspondings parts shown in Fig. 11 and in other figures of the drawings, and screws 87 (like those of Fig. 11) are employed to secure base 35 to adapter 60; the upper ends of said screws projecting into the respective recesses 86ᶜ and 86ᵈ to restrain adapter 60 and base 35 against rotary displacement relatively to panel 86.

A sheet metal plate 48, like that shown in Figs. 4 and 5, for instance, is interposed between adapter 60 and base 35 in the manner aforedescribed and for the purpose heretofore explained. A relatively long pushbutton 66, like that shown in full lines in Fig. 4, and in Fig. 5, is employed. A hollow metal bushing 88, generally similar to that shown at 61 in Figs. 4 and 5 (in respect of its peripherally milled upper end portion 88ᵇ) but having a relatively long hollow end portion of reduced diameter whose major portion is externally threaded upwardly from the lower end thereof as indicated at 88ᵃ. Said threaded end portion 88ᵃ is adapted for cooperation with the internally threaded portion 60ᵃ of adapter 60. A punched and stamped sheet metal indicating plate 64 like that shown in Figs. 4 and 5 may be interposed between the downwardly facing shoulder 88ᶜ formed on bushing 88 and the outer surface of panel 86. The base 35 in Fig. 12 may, of course, have any desired arrangement of the aforedescribed contacts and contactors associated therewith. It is to be understood that the pushbutton 66 in Fig. 12 is in its normal upper extreme position.

I claim:

1. As an article of manufacture, an actuator assembly for an electric switch of the reciprocating contactor type, said assembly comprising a machined metal bushing having an intermediate portion of polygonal contour in transverse cross section, a cylindrical externally threaded lower end portion of relatively smaller transverse dimensions, a reduced, substantially circular upper end portion, a peripheral groove formed between said upper end portion and said intermediate portion, said bushing having a centrally located passage of circular cross section extending therethrough and a relatively large circular countersink at the lower end of said passage, a cylindrical metal rod of greater length than said passage and having a free but relatively close sliding fit therein, an inverted cup-shaped sheet metal head member rigidly and permanently secured to the outer end of said rod, said rod having a threaded recess opening to the lower end thereof, a bolt and a shank threaded into said recess, said bolt having an intermediate portion of polygonal contour to facilitate tightening of said bolt, a relatively short cylindrical extension at the lower end of said intermediate portion of said bolt, a lock-washer interposed between the lower end of said rod and said intermediate portion of said bolt, and said intermediate portion cooperating with the end wall of said countersink to positively limit the outward movement of said bolt, the arrangement being such that the lower edge of said head member is adapted to peripherally overlap the upper end of said bushing in all positions of said rod.

2. In combination, an adapter member for attachment to the insulating base of a switch of the reciprocating contactor type, said adapter member having a relatively large centrally located screw threaded opening formed therein, an actuator assembly comprising a machined metal bushing having an intermediate portion of polygonal contour in transverse cross section, an externally threaded lower end portion of relatively smaller transverse dimensions adapted for cooperative engagement with said adapter opening, said bushing having a reduced substantially circular upper end portion and said bushing also having a peripheral groove formed therein between the upper end portion and said intermediate portion, said bushing having a centrally located passage of circular cross section extending therethrough and a relatively large countersink at the lower end of said passage, a metal rod of greater length than said passage and of circular cross section having a free but relatively close sliding fit within said passage, an inverted cup-shaped sheet metal head member rigidly and permanently attached to the upper end of said rod, said rod having a threaded recess opening to the lower end thereof, a bolt having a shank threaded into said recess, said bolt having an intermediate portion of polygonal contour to facilitate tightening thereof, a flat-ended extension of reduced transverse cross section at the lower end of said intermediate portion of said bolt, a lock-washer interposed between the lower end of said rod and said intermediate portion of the bolt, and said intermediate portion cooperating with the end wall of said countersink to positively limit the degree of outward movement of said bolt, whereby the lower end of said head member overlaps the upper end of said bushing in all positions of said rod.

3. As an article of manufacture, an actuator assembly for an electric switch of the reciprocating contactor type, said assembly comprising a metal bushing having a portion of polygonal contour in transverse cross section, a cylindrical externally threaded lower end portion of relatively smaller transverse dimensions, a reduced, substantially circular upper end portion, said bushing having a peripheral groove formed between said upper end portion and said portion first mentioned, said bushing having a centrally located passage of circular cross section extending therethrough and a relatively large circular countersink at the lower end of said passage, a cylindrical rod of greater length than said passage and having a relatively close sliding fit therein, an inverted cup-shaped metal head member rigidly attached to the upper end of said rod, said rod having a threaded recess opening to the lower end thereof, a bolt having a shank threaded into said recess, said bolt having an intermediate portion of polygonal contour to facilitate tightening thereof, a flat-ended extension of reduced cross section at the lower end of said intermediate portion, and said intermediate portion cooperating with the end wall of said countersink to positively limit the degree of outward movement of said rod, whereby the lower edge of said head member overlaps the upper end of said bushing in all positions of said rod.

4. As an article of manufacture, a die cast metal member for attachment to the insulating base of a switch to adapt the latter for various types of mounting to suitable supporting structures, said member being of substantially circular contour in transverse cross section and the same being provided with a pair of diametrically opposed integral lateral projections, each of said projections having a bolt passage extending therethrough to accommodate a bolt for attaching said member to said insulating base, said member having a pair of diametrically opposed substantially cylindrical recesses formed therein and opening to the outer end thereof, one or the other of said recesses being adapted to accommodate a positioning lug associated with an indicating plate of suitable form, said member having a relatively large centrally located opening of circular form, and said member having its inner end recessed in substantially concentric relationship to said central opening and having at least one relatively smaller rectangular recess communicating with said inner end recess, said inner end recess and said relatively smaller recess cooperating to accommodate an element or elements associated with the actuating member of the switch.

5. As an article of manufacture, an assembly for attachment to the insulating base of a switch of the reciprocating plunger type to adapt the latter for various types of mounting to suitable supporting structures, said assembly comprising a die cast metal adapter member having a pair of diametrically opposed integral lateral projections, each of said projections having a passage therethrough a pair of bolts inserted in said passages for attaching said adapter member to said insulating base, and a metal bushing having an externally threaded lower end, said adapter member having a relatively large centrally located tapped opening for accommodation of said threaded end of said bushing, the latter providing clearance for a switch actuating member of suitable form, said adapter member having its lower end recessed in substantially concentric relationship to said central opening to accommodate an element or elements associated with said switch actuating member.

6. The combination with a switch having an insulating base, of a die formed member for adapting said switch for various types of mounting to supporting structure, said member being provided with a pair of integral lateral projections each having a passage formed therein, and means inserted into said passages for attachment of said member to the insulating base of said switch, said member having a relatively large centrally located opening to provide clearance for a switch actuating member of suitable form, said member having its inner end recessed in substantially concentric relationship to said central opening and having at least one relatively smaller recess communicating with said first mentioned recess, said inner end recess and said relatively smaller recesses cooperating to accommodate an element or elements associated with said actuating member.

7. The combination with a switch of the reciprocating actuator type and having an insulating base, of a die cast metal member for adapting said switch for various types of mounting to supporting structure, said member having a pair of diametrically opposed integral lateral projections each having a bolt passage formed therein, and a bolt inserted into each of said passages for attachment of said member to the insulating base of said switch, said member having a pair of diametrically opposed substantially cylindrical recesses formed therein and opening to the outer end thereof, one or the other of said recesses being adapted to accommodate a positioning lug associated with an indicating plate of suitable form, said member having a relatively large centrally located opening to provide clearance for a switch actuating member of suitable form, and said member having its inner end recessed in substantially concentric relationship to said central opening to accommodate an element or elements associated with said actuating member.

CLYDE F. ROBBINS.

REFERENCES CITED

The following references are of record in the file of this patent:

UNITED STATES PATENTS

| Number | Name | Date |
| --- | --- | --- |
| 1,386,694 | Fahnestock | Aug. 9, 1921 |